United States Patent
Mercier et al.

(10) Patent No.: US 8,818,102 B2
(45) Date of Patent: Aug. 26, 2014

(54) METHOD FOR SPECTRAL-SPATIAL-TEMPORAL IMAGE DETECTION

(75) Inventors: Michael Mercier, Nashua, NH (US); Joseph M. Schlupf, Newburyport, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 84 days.

(21) Appl. No.: 13/542,683

(22) Filed: Jul. 6, 2012

(65) Prior Publication Data

US 2013/0016909 A1 Jan. 17, 2013

Related U.S. Application Data

(60) Provisional application No. 61/506,907, filed on Jul. 12, 2011.

(51) Int. Cl.
| | |
|---|---|
| *G06K 9/46* | (2006.01) |
| *G06K 9/40* | (2006.01) |
| *G06T 7/00* | (2006.01) |
| *G01J 3/36* | (2006.01) |
| *G01J 3/28* | (2006.01) |

(52) U.S. Cl.
CPC ... *G06K 9/46* (2013.01); *G01J 3/36* (2013.01); *G06T 7/00* (2013.01); *G01J 3/2823* (2013.01)
USPC ............................. 382/191; 382/262; 382/274

(58) Field of Classification Search
None
See application file for complete search history.

(56) References Cited

U.S. PATENT DOCUMENTS

| | | | | |
|---|---|---|---|---|
| 8,437,503 | B2 * | 5/2013 | Verdant | 382/103 |
| 2002/0146169 | A1 * | 10/2002 | Sukthankar et al. | 382/170 |
| 2003/0099397 | A1 * | 5/2003 | Matsugu et al. | 382/173 |
| 2007/0242878 | A1 * | 10/2007 | Maxwell et al. | 382/168 |
| 2011/0235867 | A1 * | 9/2011 | Lehmann et al. | 382/111 |

OTHER PUBLICATIONS

"Image Masks" [online]. Wikipedia, 2014 [retrieved Mar. 3, 2014]. Retrieved from the Internet: < URL: http://en.wikipedia.org/wiki/Image_mask#Image_masks >, p. 1.*
"Bitwise AND" [online]. Wikipedia, 2014 [retrieved Mar. 3, 2014]. Retrieved from the Internet: < URL: http://en.wikipedia.org/wiki/Bitwise_AND#AND >, p. 1.*

* cited by examiner

*Primary Examiner* — Bhavesh Mehta
*Assistant Examiner* — David F Dunphy
(74) *Attorney, Agent, or Firm* — Global IP Services, PLLC; Prakash Nama; Daniel J. Long

(57) ABSTRACT

A method of spectral-spatial-temporal image detection is disclosed. In one embodiment, a spectrally differenced image is obtained by computing a difference of at least two intensity values in at least two spectral bands of an image. Further, a spatially filtered spectral image is obtained by applying a spatial median filter to the obtained spectrally differenced image. Furthermore, a temporal image is obtained by determining a temporal pixel value difference using a computed predictive frame difference. In addition, a spectral-spatial-temporal filtered image for detection is obtained by using the obtained spatially filtered spectral image and the temporal image.

10 Claims, 2 Drawing Sheets

METHOD FOR SPECTRAL-SPATIAL-TEMPORAL IMAGE DETECTION

CROSS-REFERENCE TO RELATED APPLICATION

This Application claims rights under 35 USC §119(e) from U.S. application Ser. No. 61/506,907 filed Jul. 12, 2011, the contents of which are incorporated herein by reference.

BACKGROUND OF THE INVENTION

1. Field of the Invention

The present invention relates to optical sensors, more specifically to filtering false detections in optical sensor data.

2. Brief Description of Related Art

One of the most common uses of optical sensors in a military setting is to detect and counter a launched ordnance as part of a threat detection system. To achieve maximum protection of the host platform, it is crucial to minimize false detections and also accurately identify the type of threat detected by the system.

Each type of launched ordnance typically emits a three-part signature having a spectral element, a spatial element, and a temporal element which is detected by the threat detection system. The spectral element is manifested as an intensity ratio of multiple spectral bands emitted by the detected signature. The spatial element is typically incorporated into spectral intensity data by way of spatial median filter and represents the size of the source within the image pixel space. A launched ordnance signature will exhibit the spatial qualities of a point source. Finally, the temporal element of a launched ordnance signature will indicate a brief "turn-on" followed by a longer, more sustained pulse and contain minimal noise.

Existing methods set thresholds in all three elements and separately filter each one to eliminate detections. First, the spatial median filter is applied to the spectral data, where it is then filtered for proper spectral ratio and point source status. Then yet another filter searches for the correct temporal signature. However, this method requires either that all of the data be filtered at least three times, taxing host platform processing resources or that false detections be allowed whenever at least one of the signature elements is satisfied.

SUMMARY OF THE INVENTION

A method for spectral-spatial-temporal image detection is disclosed. According to one aspect of the present subject matter, the method includes obtaining a spectrally differenced image by computing a difference of at least two intensity values in at least two spectral bands of an image. Further, a spatially filtered spectral image is obtained by applying a spatial median filter to the obtained spectrally differenced image. Furthermore, a temporal image is obtained by determining a temporal pixel value difference using a computed predictive frame difference. In addition, a spectral-spatial-temporal filtered image for detection is obtained by using the obtained spatially filtered spectral image and the temporal image. Also, the spectral-spatial-temporal filtered image is filtered using a spectral-spatial-temporal threshold value.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The exemplary embodiments described herein in detail for illustrative purposes are subject to many variations in structure and design.

Figure 1:
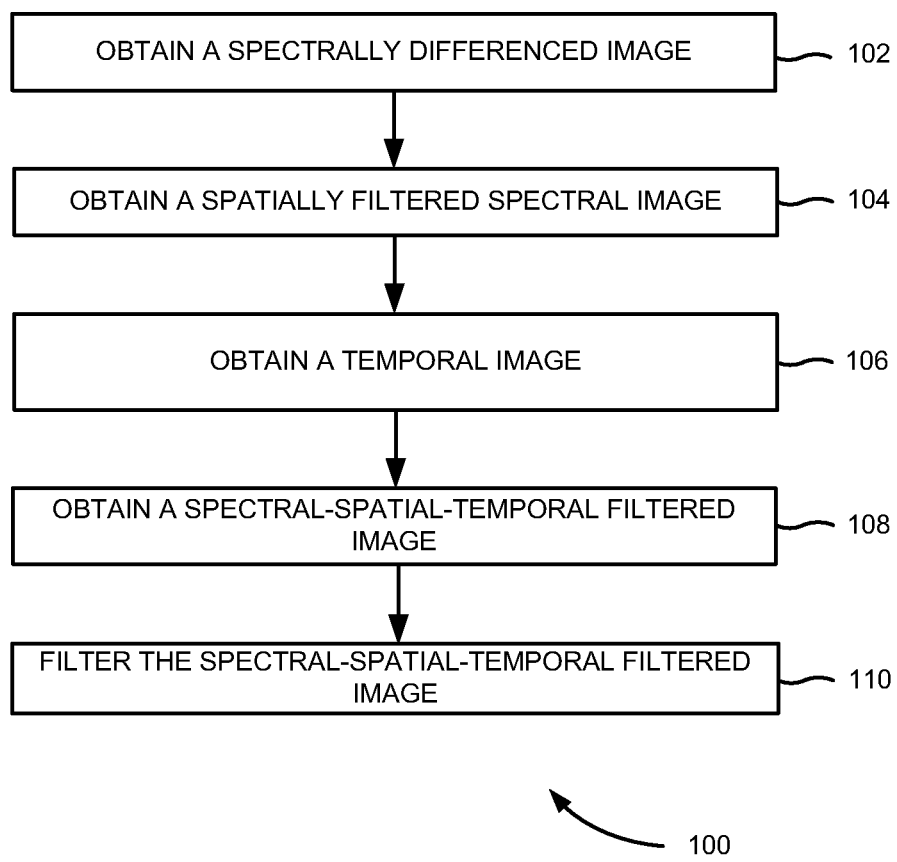
FIG. 1 illustrates a flowchart of a method of spectral-spatial-temporal image detection, according to an embodiment of the present subject matter.

FIG. 1 illustrates a flowchart 100 of a method of spectral-spatial-temporal image detection, according to an embodiment of the present subject matter. At block 102, a spectrally differenced image is obtained by computing a difference of at least two intensity values in at least two spectral bands of an image. In one embodiment, a background source spectral ratio is determined using at least one of radiant source, such as baseline intensities, camera optics sensitivity properties and atmospheric transmission properties. Further, a spectral difference is computed for each pixel in the image by applying the background source spectral ratio to the spectral band-specific radiant intensity value of the pixel.

At block 104, a spatially filtered spectral image is obtained by applying a spatial median filter to the obtained spectrally differenced image. In one embodiment, a median filter that is based on computing a median value of a 3×3 pixel area around a target pixel and subtracting the computed media value from the target pixel value is applied to remove a spectral bias and also to act as a point source filter, which reduces intensity of large spectral objects that do not exhibit point source qualities.

At block 106, a temporal image is obtained by determining a temporal pixel value difference using a computed predictive frame difference. In one embodiment, a filtered image is obtained by applying a spatial filter using a blurring function that is based on a 2×2 pixel averaging filter. Further, the temporal image is obtained by applying a predictive frame difference (PFD) filter on to the obtained filtered image. The PFD filter is based on extrapolating data from a previous frame and making prediction on current and future frames. This is explained in more detail with reference to FIG. 2.

At block 108, a spectral-spatial-temporal filtered image for detection is obtained by using the obtained spatially filtered spectral image and the temporal image. In one embodiment, the spectral-spatial-temporal filtered image for detection is obtained by multiplying at least one pixel value in the obtained spatially filtered spectral image by at least one pixel value from the obtain temporal image. At block 110, the spectral-spatial-temporal filtered image is filtered using a spectral-spatial-temporal threshold value.

Figure 2:
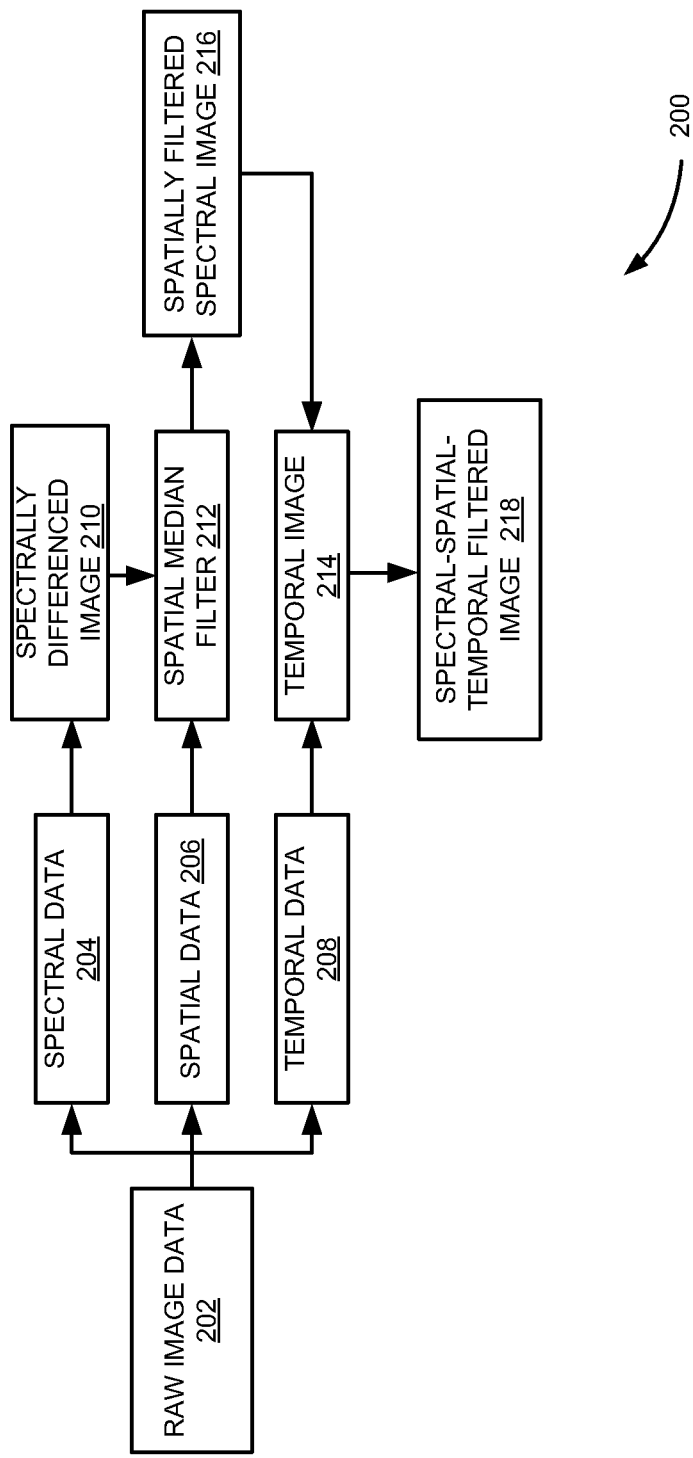
FIG. 2 is another flowchart of the method of the spectral-spatial-temporal image detection, according to an embodiment of the present subject matter.

Referring now to FIG. 2, which is another flowchart 200 of the method of spectral-spatial-temporal image detection, according to an embodiment of the present subject matter. In FIG. 2, raw image data 202 includes a series of images which are received. In one embodiment, spectral data 204, spatial data 206 and temporal data 208 of the received raw image data 202 are obtained. The spectral data 204 includes an intensity ratio of multiple spectral bands in a frame, the spatial data 206 represents the size of a source within the frame, and the temporal data 208 indicates a brief "turn-on" followed by a longer, more sustained pulse and contains minimal noise.

In operation, a spectrally differenced image 210 is obtained by computing a difference of at least two intensity values in at least two spectral bands of an image. In one embodiment, a background source spectral ratio is determined using at least one of radiant source, such as baseline intensities, camera optics sensitivity properties and atmospheric transmission properties. Further, a spectral difference is computed for each pixel in the frame by applying the background source spectral ratio to a spectral band-specific radiant intensity value of the pixel.

Further in operation, the spatial data 206 is incorporated into the spectral data 204 by way of a spatial median filter 212. In one embodiment, the spatial median filter 212 is applied to the spectrally differenced image 210, using the spatial data 206, to obtain a spatially filtered spectral image 216. For example, a median filter that is based on computing a median value of a 3×3 pixel area around a target pixel and subtracting the computed median value from the target pixel value to remove a spectral bias and also to act as a point source filter is applied. The median filter also reduces intensity of large spectral objects that do not exhibit point source qualities.

Furthermore in operation, a temporal image 214 is obtained by determining a temporal pixel value difference using a computed predictive frame difference. In one embodiment, a filtered image is obtained by applying a spatial filter using a blurring function that is based on a 2×2 pixel averaging filter. For example, the 2×2 pixel averaging filter averages the pixel values in 2×2 pixel in a frame, moves to the top left pixel of the 2×2 pixel and loses the last row and last column of the 2×2 pixel. Further, the temporal image 214 is obtained by applying a predictive frame difference (PFD) filter on to the obtained filtered image. The PFD filter is based on extrapolating data from a previous frame and making prediction on current and future frames.

In addition in operation, a spectral-spatial-temporal filtered image 218 for detection is obtained by using the obtained spatially filtered spectral image 216 and the temporal image 214. In one embodiment, the spectral-spatial-temporal filtered image 218 for detection is obtained by multiplying at least one pixel value in the obtained spatially filtered spectral image 216 by at least one pixel value from the obtain temporal image 214. Also in operation, the spectral-spatial-temporal filtered image 218 is filtered using a spectral-spatial-temporal threshold value.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method of spectral-spatial-temporal image detection, comprising:
   obtaining a spectrally differenced image by computing a difference of at least two intensity values in at least two spectral bands of an image;
   obtaining a spatially filtered spectral image by applying a spatial median filter to the obtained spectrally differenced image, comprising:
      applying a median filter that is based on computing a median value of a 3×3 pixel area around a target pixel and :subtracting the computed median value from the target pixel value to remove a spectral bias and also to act as a point source filter;
   obtaining a temporal image by determining a temporal pixel value difference using a computed predictive frame difference; and
   obtaining a spectral-spatial-temporal filtered image for detection by multiplying at least one pixel value in the obtained spatially filtered spectral image by at least one pixel value from the temporal image.

2. The method of claim 1, wherein obtaining the spectrally differenced image by computing a difference of at least two intensity values in at least two spectral bands of the image comprises:
   determining background source spectral ratio using at least one of radiant source from the group consisting of baseline intensities, camera optics sensitivity properties and atmospheric transmission properties; and
   computing spectral difference for each pixel in the image by applying the background source spectral ratio to the spectral band-specific radiant intensity value of the pixel.

3. The method of claim 1, wherein applying the median filter reduces intensity of large spectral objects that do not exhibit point source qualities.

4. The method of claim 1, wherein obtaining the temporal image by determining a temporal pixel value difference using a computed predictive frame difference comprises:
   obtaining a filtered image by applying a spatial filter using a blurring function that is based on a 2×2 pixel averaging filter; and
   obtaining the temporal image by applying a predictive frame difference (PFD) filter on to the obtained filtered image, wherein the PFD filter extrapolates data from previous frames and makes prediction on current and future frames.

5. The method of claim 1, further comprising:
   filtering the spectral-spatial-temporal filtered image using a spectral-spatial-temporal threshold value.

6. A method of spectral-spatial-temporal image detection, comprising:
   obtaining a spectrally differenced image by computing a difference of at least two intensity values in at least two spectral bands of an image, wherein obtaining the spectral differenced image comprises:
      determining background source spectral ratio using at least one of radiant source from the group consisting of baseline intensities, camera optics sensitivity properties and atmospheric transmission properties; and
      computing spectral difference for each pixel in the image by applying the background source spectral ratio to the spectral band-specific radiant intensity value of the pixel;
   obtaining a spatially filtered spectral image by applying a spatial median filter to the obtained spectrally differenced image, wherein obtaining the spatially filtered spectral image comprises:
      applying a median filter that is based on computing a median value of a 3×3 pixel area around a target pixel and subtracting the computed median value from the target pixel value to remove a spectral bias and also to act as a point source filter, which reduces intensity of large spectral objects that do not exhibit point source qualities;

obtaining a temporal image by determining a temporal pixel value difference using a computed predictive frame difference: and obtaining a spectral-spatial-temporal filtered image for detection by multiplying at least one pixel value in the obtained spatially filtered spectral image by at least one pixel value from the temporal image.

7. The method of claim 6, wherein obtaining the temporal image by determining a temporal pixel value difference using a computed predictive frame difference comprises:

obtaining a filtered image by applying a spatial filter using a blurring function that is based on a 2×2 pixel averaging filter; and obtaining the temporal image by applying a predictive frame difference (PFD) filter on to the obtained filtered image, wherein the PFD filter extrapolates data from previous frames and makes prediction on current and future frames.

8. The method of claim 7, further comprising:

filtering the spectral-spatial-temporal filtered image using a spectral-spatial-temporal threshold value.

9. A method of spectral-spatial-temporal image detection, comprising:

obtaining a spectrally differenced image by computing a difference of at least two intensity values in at least two spectral bands of an image, wherein obtaining the spectral differenced image comprises:

determining background source spectral ratio using at least one of radiant source from the group consisting of baseline intensities, camera optics sensitivity properties and atmospheric transmission properties; and computing spectral difference for each pixel in the image by applying the background source spectral ratio to the spectral band-specific radiant intensity value of the pixel;

obtaining a spatially filtered spectral image by applying a spatial median filter to the obtained spectrally differenced image, wherein obtaining the spatially filtered spectral image comprises:

applying a median filter that is based on computing a median value of a 3×3 pixel area around a target pixel and subtracting the computed median value from the target pixel value to remove a spectral bias and also to act as a point source filter, which reduces intensity of large spectral objects that do not exhibit point source qualities;

obtaining a temporal image by determining a temporal pixel value difference using a computed predictive frame difference, wherein obtaining the temporal image comprises:

obtaining a filtered image by applying a spatial filter using a blurring function that is based on a 2×2 pixel averaging filter: and obtaining the temporal image by applying a predictive frame difference (PFD) filter on to the obtained filtered image, wherein the PFD filter extrapolates data from previous frames and makes prediction on current and future frames; and obtaining a spectral-spatial-temporal filtered image for detection by using the obtained spatially filtered spectral image and the temporal image, and wherein obtaining the spectral-spatial-temporal filtered image comprises obtaining the spectral-spatial-temporal filtered image for detection by multiplying at least one pixel value in the obtained spatially filtered spectral image by at least one pixel value from the obtain temporal image.

10. The method of claim 9, further comprising:

filtering the spectral-spatial-temporal filtered image using a spectral-spatial-temporal threshold value.

* * * * *